Patented Dec. 28, 1926.

1,611,962

UNITED STATES PATENT OFFICE.

MATS H. TOLONEN, OF ASTORIA, OREGON.

LOTION.

No Drawing.  Application filed April 6, 1926. Serial No. 100,103.

This invention relates to a lotion and pertains particularly to a topical remedy for use in treatment of eczema and other skin diseases.

The primary object of this invention is the provision, in a manner as hereinafter set forth, of an improved medical compound of simple, inexpensive and easily compounded ingredients, which mixture has been found to be particularly efficacious in controlling and curing eczema and other skin affections.

The compound has for one of its ingredients a juice extracted from the bark of the madrona tree. Applicant has discovered that the juice of the bark of this tree when used in combination with certain other chemical and medical substances gives extremely good results in treating diseases of the type referred to, it having been found that many cases of eczema and eczematoid conditions have yielded to treatment with this compound, after other methods of treatment had failed.

The compound embodying this invention contains the following ingredients in approximately the proportions stated:—Vinegar, one quart, copper sulphate, (blue stone) 3¼ ounces, lead acetate, (sugar of lead) ¾ ounce, madrona bark juice, ¼ of 1 fluid ounce, pure honey, three tablespoonfuls, water, a sufficient quantity.

The order of mixing the above set forth ingredients is as follows:—

Into the specified quantity of vinegar there is stirred until dissolved, the copper sulphate. Next, the required amount of lead acetate is mixed with approximately one tablespoonful of warm water until dissolved. The dissolved lead acetate is then mixed with the vinegar and copper sulphate solution.

The required amount of madrona bark juice, after being filtered, is then poured into the above set forth solution and the mixture thoroughly stirred after which the three tablespoonfuls of honey is incorporated and the completed mixture thoroughly agitated. The compound is then ready for use.

In making use of the above set forth compound, the parts to be treated are first thoroughly cleansed with hot water and thoroughly dried. The medicine is then applied with a swab or by other appropriate means, not oftener than twice each day.

The madrona bark juice specified in this formula is obtained by boiling the bark in a sufficient quantity of water until the juice has been drawn therefrom after which the solution is strained and ready for use. The madrona tree (*Arbutus menziessi*) is one of a species of shrubs or small trees of the bearberry species

Having thus described my invention what I claim is:—

1. A lotion of the character set forth, containing, as its chief constituent, the extracted juice of the bark of the madrona tree.

2. A lotion for the treatment of eczema containing the extracted juice of the bark of the madrona tree, vinegar, copper sulphate, lead acetate, honey, and water.

In testimony whereof, I affix my signature hereto.

MATS H. TOLONEN.